US010089805B1

(12) United States Patent
Hwang et al.

(10) Patent No.: US 10,089,805 B1
(45) Date of Patent: Oct. 2, 2018

(54) METHOD FOR HOUSEHOLDER OF MANSION TO MANAGE ENTRANCE BY SMART PHONE

(71) Applicant: National Taipei University of Technology, Taipei (TW)

(72) Inventors: Shaw Hwa Hwang, Taipei (TW); Bing Chih Yao, Taipei (TW); Kuan Lin Chen, Taipei (TW); Yao Hsing Chung, Taipei (TW); Chi Jung Huang, Taipei (TW); Cheng Yu Yeh, Taipei (TW); Shun Chieh Chang, Taipei (TW); Li Te Shen, Taipei (TW); Ning Yun Ku, Taipei (TW); Tzu Hung Lin, Taipei (TW); Ming Che Yeh, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 15/475,184

(22) Filed: Mar. 31, 2017

(51) Int. Cl.
*G07C 9/00* (2006.01)
*H04W 88/02* (2009.01)

(52) U.S. Cl.
CPC ......... *G07C 9/00166* (2013.01); *H04W 88/02* (2013.01)

(58) Field of Classification Search
CPC ......................... G07C 9/00166; H04W 88/02
See application file for complete search history.

(56) References Cited

U.S. PATENT DOCUMENTS

2013/0017812 A1* 1/2013 Foster ................ H04L 12/2825 455/417
2015/0221147 A1* 8/2015 Daniel-Wayman .......................... G07C 9/00103 340/5.54
2016/0330413 A1 11/2016 Scalisi et al.

* cited by examiner

*Primary Examiner* — Leon Flores
(74) *Attorney, Agent, or Firm* — Bacon & Thomas, PLLC

(57) ABSTRACT

The present invention provides a method for householder of mansion to manage entrance by smart phone, so that the householder can manage entrance at outside. When a visitor pushes a doorbell of a mansion door machine, the householder at outside uses a smart phone to conduct audio and video communication with the visitor. If the householder agrees to let the visitor go in, the householder instructs the smart phone to generate a password for the visitor to memorize and let the visitor enter the mansion. The password is also sent to a home door machine of the householder. When the visitor an ives the home door machine of the householder, input the password. If the password inputted by the visitor is the same as the password generated by the smart phone, then the home door will open to let the visitor go in.

2 Claims, 5 Drawing Sheets

METHOD FOR HOUSEHOLDER OF MANSION TO MANAGE ENTRANCE BY SMART PHONE

FIELD OF THE INVENTION

The present invention relates to a method for householder of mansion to manage entrance by smart phone, and more particularly to a method to manage entrance by smart phone for those householders at outside of the mansion or forget to bring keys.

BACKGROUND OF THE INVENTION

Referring to FIG. 1, which is a schematic communication diagram for a conventional mansion doorbell machine 1. A visitor 2 pushes the doorbell of the mansion doorbell machine 1, the mansion doorbell machine 1 therefore notifies related householder 3, and let the related householder 3 conduct audio and video communication with the visitor 2. If the related householder 3 thinks there is no problem with the visitor 2, then the related householder 3 pushes a key on an intercom to open the mansion door and let the visitor go in.

If the related householder 3 is at outside of the mansion, then this conventional entrance management is unable to let the visitor 2 go in. But sometimes the visitor 2 is an official with the duty to investigate a criminal case or a fire accident, or the visitor 2 is a householder at outside of the mansion who forgets to bring keys. These conditions are the motives of the present invention.

SUMMARY OF THE INVENTION

The object of the present invention is to provide a method for householder of mansion to manage entrance by smart phone, so that the householder can manage entrance at outside.

The structure of the doorbell communication according to the present invention comprises a mansion door machine, a plurality of home door machines, a network, a server and a smart phone of a householder, the mansion door machine is connected with the home door machines by wires, the mansion door machine communicates with the server and the smart phone of the householder by the network.

The method for householder of mansion to manage entrance by smart phone according to the present invention comprises three major steps as described below.

When a visitor pushes a doorbell ors the mansion door machine, the mansion door machine lets the visitor use a camera and microphone, a loudspeaker on the mansion door machine to conduct audio and video communication with the smart phone of the householder. If the householder thinks that there is no problem to let the visitor go in, then instructs the smart phone to generate a password randomly, and sends the password to the server and the mansion door machine sequentially ibr displaying on a display unit of the mansion door machine, ask the visitor to memorize the password, and let an electonic latch of the mansion door machine open a door of the mansion so that the visitor can enter the mansion.

The mansion door machine also sends the password to the home door machine of the householder. When the visitor enters the mansion and arrives the home door machine, the visitor uses a keyboard on the home door machine to input the password. If the password inputted by the visitor is the same as the password instructed by the householder, then the smart phone instructs an I0 electronic latch of the home door machine to open the door of the householder and let the visitor go in.

If the password inputted by the visitor is not the same as the password instructed by the householder, then the home door machine will let the visitor input the password several times. If the visitor inputs the password several times, but still not correct, then let the visitor use the camera and microphone, the loudspeaker on the home door machine to conduct audio and video communication with the smart phone of the householder. After the audio and video communication between the householder and the visitor, if the householder agrees to let the visitor go in, then instructs an electronic latch of the home door machine to open the door of the householder, and let the visitor go in.

DETAILED DESCRIPTIONS OF THE PREFERRED EMBODIMENTS

Figure 1:
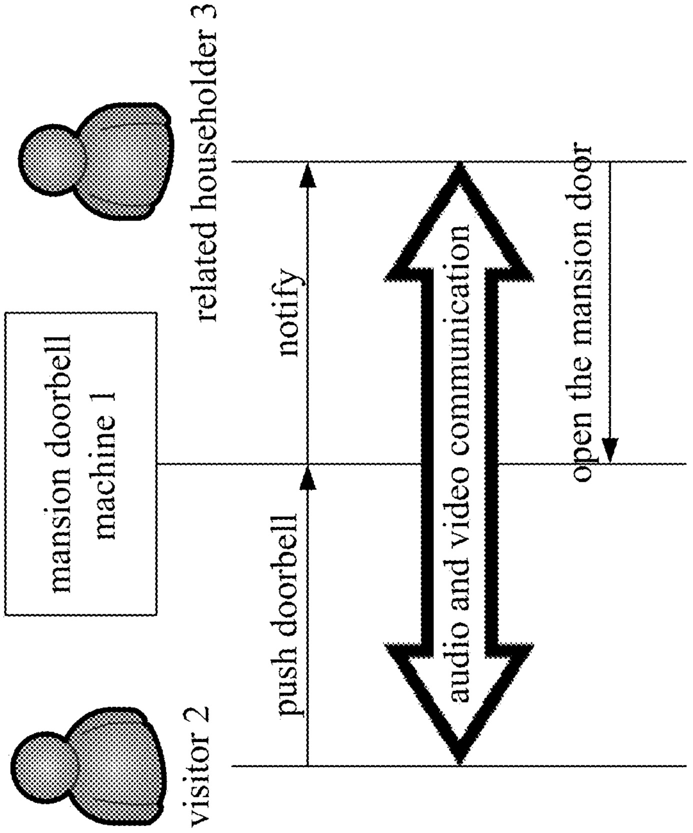
Fig. 1 (prior art)
FIG. 1 shows schematically a diagram for a conventional mansion doorbell machine.
Figure 2:
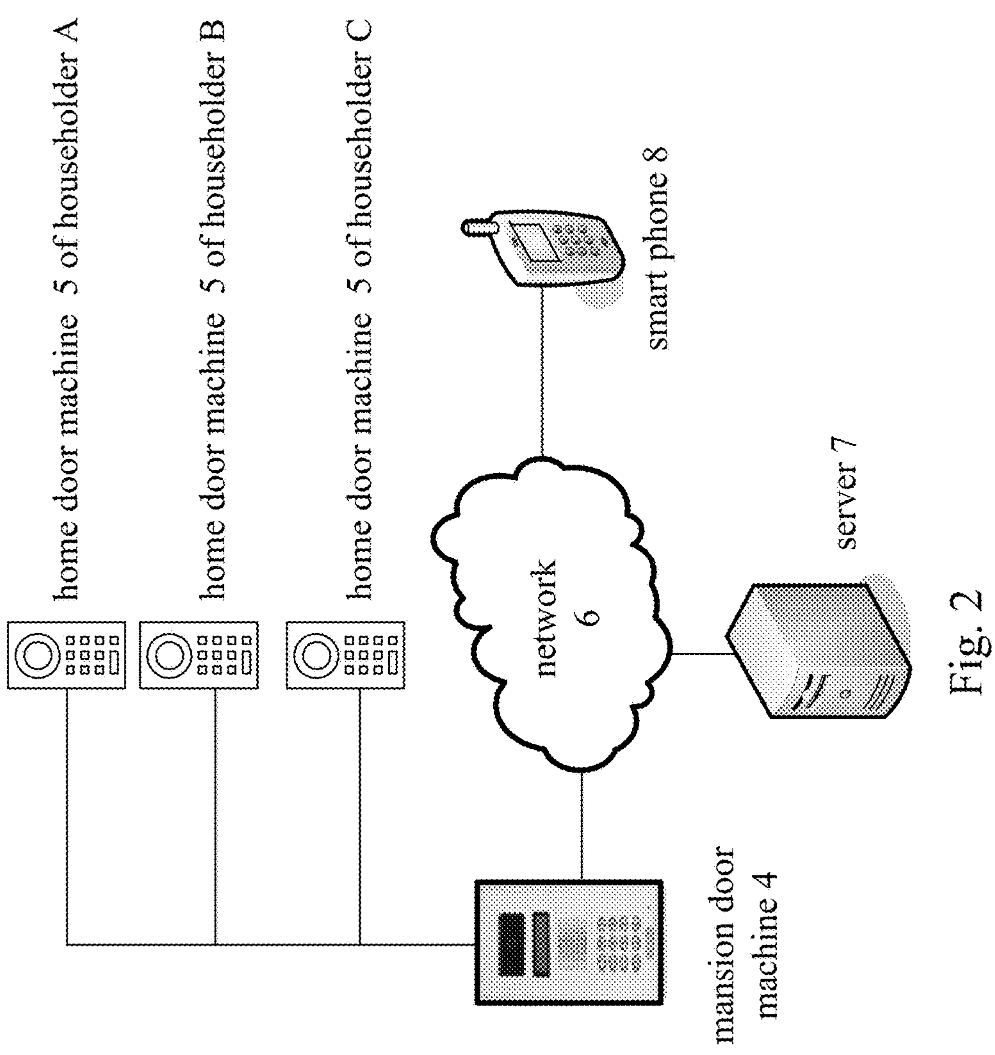
FIG. 2 shows schematcally the structure of communication according to the present invention..

Referring to FIG. 2, which shows schematcally the structure of communication according to the present invention. A mansion door machine 4 is equipped on the nasion door, and connected with a home door machine 5 of every householder by wires, and communicates with a server 7 and a smart phone 8 of the householder 3 by a network 6. The software program according to the present invention is stored in the server 7 to enable the householder 3 for managing entrance by the smart phone 8.

Figure 3:
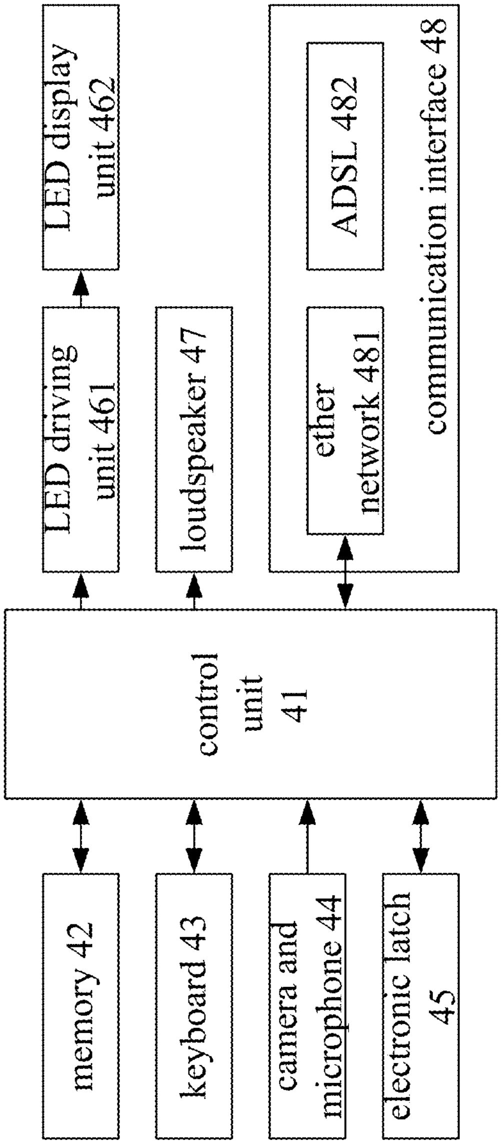
FIG. 3 shows schematically a block diagram of the mansion door machine according to the present invention.

The block diagram of the mansion door machine 4, as shown in FIG. 3, comprises a control unit 41, a memory 42, a keyboard 43, camera and microphone 44, an electronic latch 45, LED driving unit 461, LED display unit 462, a loudspeaker 47, a communication interface 48, an ether network 481 and an ADSL 482. ADSL means "Asymmetric Digital Subscriber Line".

Figure 4:
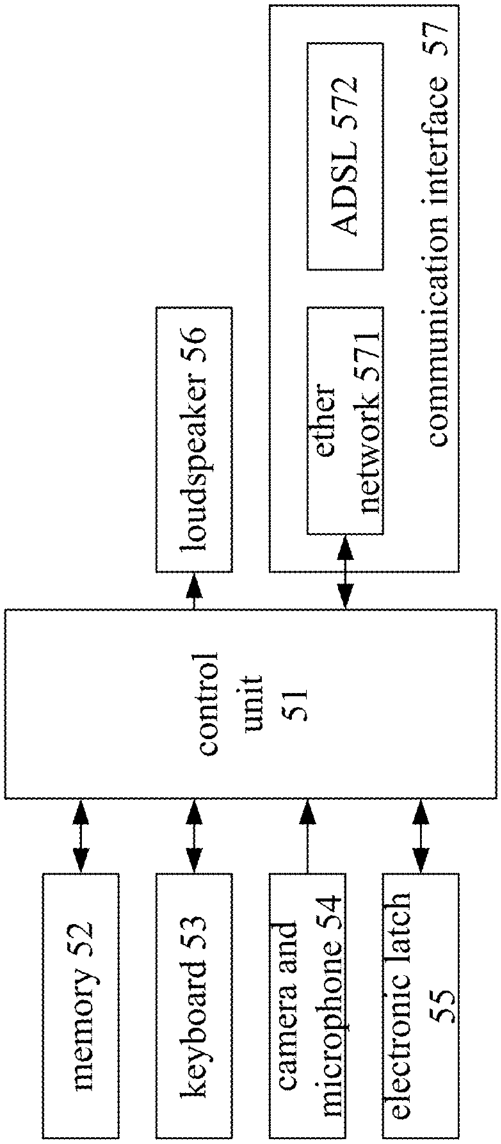
FIG. 4 shows schematically a block diagram of the home door machine according to the present invention.

The block diagram of the home door machine 5, as shown in FIG. 4, comprises a control unit 51, a memory 52, a keyboard 53, camera and microphone 54, an electronic latch 55, a loudspeaker 56, a communication interface 57, an ether network 571 and an ADSL 572. ADSL means "Asymmetric Digital Subscriber Line".

Figure 5:
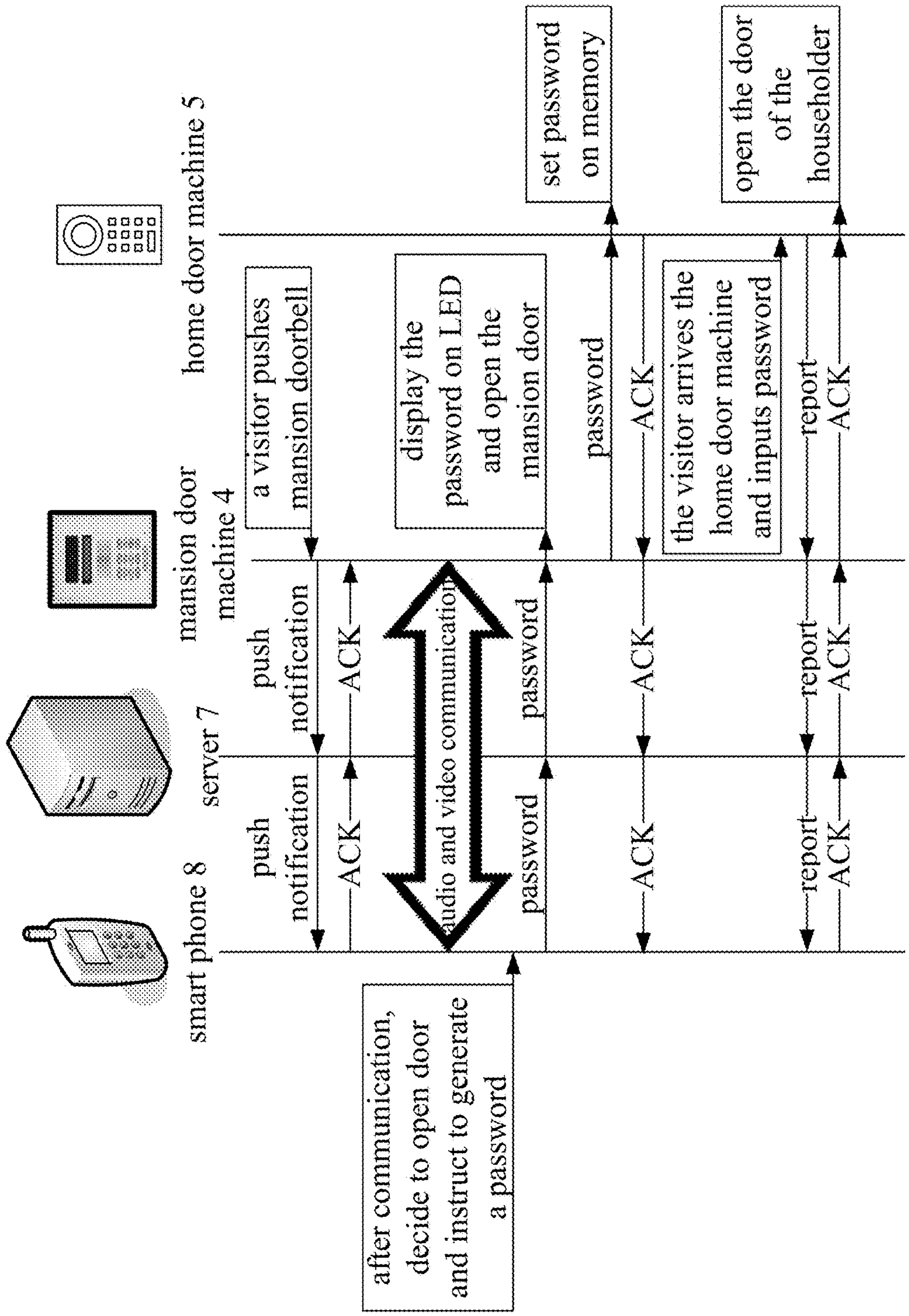
FIG. 5 shows schematically the procedures of the software program according to the present invention.

The software program according to the present invention is stored in the server 7 to enable the householder 3 for managing entrance by the smart phone 8, with procedures as shown in FIG. 5. Referring to FIG. 5, a visitor 2 pushes a doorbell on the mansion door machine 4, the mansion door machine 4 sends the doorbell message to the server 7 and the smart phone 8 sequentially. The smart phone 8 then issues ACK message back to the server 7 and then to the mansion door machine 4 for expressing acknowledgement.

Thereafter the visitor 2 uses the camera and microphone 44, loudspeaker 47 on the mansion door machine 4 to conduct audio and video communication with the smart phone 8 of the householder 3. After the audio and video communication between the householder 3 and the visitor 2, if the householder 3 thinks that there is no problem to let the visitor 2 go in, then instructs the software program according to the present invention to generate a password randomly, and sends the password to the server 7 and the mansion door machine 4 sequentially for displaying on the LED display unit 462, ask the visitor 2 to memorize the password, and let the electonic latch 45 open the mansion door so that the visitor 2 can enter the mansion.

The mansion door machine 4 also sends the password to the memory 52 in the home door machine 5. The home door machine 5 returns an ACK message to the mansion door machine 4, the server 7 and the smart phone 8 for expressing no error.

The visitor 2 enters the mansion and then arrives the home door machine 5 of the householder 3, and uses the keyboard 53 on the home door machine 5 to input the password. The password inputted by the visitor 2 is reported to the mansion door machine 4, the server 7 and the smart phone 8. If the password inputted by the visitor 2 is the same as the password instructed by the householder 3, then the smart phone 8 returns ACK message to the server 7, the mansion door machine 4 and the home door machine 5 sequentially for expressing no error therefore the electronic latch 55 of the home door machine 5 opens the door of the householder 3 and let the visitor 2 go in.

If the password inputted by the visitor 2 is not the same as the password instructed by the householder 3, then the home door machine 5 will let the visitor 2 input the password several times (specified by the software program). If the visitor 2 inputs the password several times, but still not correct, then let the visitor 2 use the camera and microphone 54, loudspeaker 56 on the home door machine 5 to conduct audio and video communication ith the smart phone 8 of the householder 3. After the audio and video communication between the householder 3 and visitor 2, if the householder 3 thinks that it is OK to let the visitor 2 go in, then instructs the electronic latch 55 to open the door of the householder 3, and let the visitor 2 go in.

The scope of the present invention depends upon the following claims, and is not limited by the above embodiments.

What is claimed is:

1. A method for managing entrance to a mansion by smart phone, in a communication structure to implement said method, said communication structure comprising a mansion door machine, a home door machine, a network, a server and a smart phone of a householder, the mansion door machine is connected with the home door machine by wires, the mansion door machine communicates with the server and the smart phone of the householder by the network, the method comprising the steps of:

in the mansion door machine, recognizing a visitor push of a doorbell on the mansion door machine, and when the visitor push of the doorbell is recognized, enabling a camera, a microphone and a loudspeaker on the mansion door machine to conduct audio and video communication with the smart phone of the householder;

in the smart phone, accepting a householder instruction to generate a password randomly, and sending the password to the server and the mansion door machine sequentially for displaying on a display unit of the mansion door machine for the visitor to view and memorize;

in the mansion door machine, opening an electonic latch of the mansion door machine to open a door of the mansion so that the visitor can enter the mansion; and in the mansion door machine, sending the password to the home door machine after the visitor enters in the mansion and arrives the home door machine, and in the home door machine inputting a password on a keypad of the home door machine, and when the password inputted in the home door machine is the same as the password instructed by the householder, the smart phone instructing an electronic latch of the home door machine to open a door of the householder and let the visitor go in.

2. The method for householder of mansion to manage entrance by smart phone according to claim 1, wherein when the password inputted in the home door machine is not the same as the password instructed by the householder, then in the home door machine inputting the password at least one additional time; and when the password inputted in the home door machine remains incorrect after a number of attempts, activating the camera, the microphone and the loudspeaker on the home door machine for the visitor to conduct audio and video communication with the smart phone of the householder;

after the audio and video communication between the householder and the visitor, accepting an instruction from the householder to activate an electronic latch to open a door of the householder, letting the visitor go in.

* * * * *